(12) United States Patent
Hashizume

(10) Patent No.: US 7,088,365 B2
(45) Date of Patent: Aug. 8, 2006

(54) MAP DISPLAY DEVICE AND METHOD FOR DISPLAYING MAP

(75) Inventor: Masayuki Hashizume, Kariya (JP)

(73) Assignee: Denso Corporation, Kariya (JP)

( * ) Notice: Subject to any disclaimer, the term of this patent is extended or adjusted under 35 U.S.C. 154(b) by 65 days.

(21) Appl. No.: 10/914,176

(22) Filed: Aug. 10, 2004

(65) Prior Publication Data

US 2005/0052472 A1    Mar. 10, 2005

(30) Foreign Application Priority Data

Sep. 8, 2003    (JP)    .............................. 2003-315696

(51) Int. Cl.
G06T 3/00    (2006.01)
G06T 3/40    (2006.01)
(52) U.S. Cl. ...................... 345/428; 345/629; 701/212
(58) Field of Classification Search ................ 345/629, 345/428; 701/212
See application file for complete search history.

(56) References Cited

U.S. PATENT DOCUMENTS 5,864,305 A * 1/1999 Rosenquist ................. 340/905

6,725,154 B1 * 4/2004 Kamikawa et al. ......... 701/208

FOREIGN PATENT DOCUMENTS

| JP | A-02-004285 | 1/1990 |
|---|---|---|
| JP | A-2000-283784 | 10/2000 |
| JP | A-2003-005632 | 1/2003 |
| JP | A-2003-066831 | 3/2003 |
| JP | A-2003-114130 | 4/2003 |

OTHER PUBLICATIONS

Office Action issued from Japanese Patent Office issued on Jan. 24 2006 for the corresponding Japanese patent application No. 2003-315696 (a copy and English translation thereof).

* cited by examiner

*Primary Examiner*—Almis R. Jankus
(74) *Attorney, Agent, or Firm*—Posz Law Group, PLC

(57) ABSTRACT

In a map display device, a photographic map can be displayed in different modes. When it is determined that the photographic map is displayed in a combined map mode, a road line is displayed on a road of the photographic map at a display scale equal to or smaller than 100 m scales. At a scale larger than 100 m scales, information items that provide road information other than the road line are displayed on the photographic map. Since the road line is not displayed on the photographic map, the information items other than the road line are easily recognized.

12 Claims, 5 Drawing Sheets

MAP DISPLAY DEVICE AND METHOD FOR DISPLAYING MAP

CROSS REFERENCE TO RELATED APPLICATION

This application is based on and incorporates herein by reference Japanese Patent Application No. 2003-315696 filed on Sep. 8, 2003.

FIELD OF THE INVENTION

The present invention relates to a map display device and a method for displaying a map.

BACKGROUND OF THE INVENTION

A map display device for displaying a photographic map is proposed in JP-A-2000-283784. The device displays the photographic map using satellite photographs and a travel route to a destination on the photographic map. When the travel route is displayed on the photographic map, it may stand out from the satellite photograph depending on how it is displayed. In such a case, information items displayed on the map other than the travel route are difficult to recognize.

SUMMARY OF THE INVENTION

The present invention therefore has an objective to provide a map display device for displaying a photographic map and information items such that the information items are easily recognized. A map display device of the present invention includes map data storing means, display means, scale changing means, and display control means.

The map data storing means stores photographic data and map data. The photographic data contains photographs taken from the sky and the map data contains information on roads included in the map. The display means displays a photographic map based on the photographic data and the map data. The scale changing means changes a scale of the map. The display control means controls display conditions of road information displayed on the photographic map according to the scale changed by the scale changing means.

When the photographic map is displayed at a scale that a construction or a shape of a road is easily recognized, the road information is deleted or toned down. As a result, information items other than the road information are easily recognized.

The present invention has another objective to provide a method for displaying a map. A method of the present invention includes displaying a photographic map and an information item, and controlling display condition of the information item. Data on photographs taken from the sky is included in the photographic data. The information item that provides road information is included in the map data. The photographic data and the map data are stored by the map data storing means. The photographic map is displayed based on the photographic data and the map data. The display condition of the information item is controlled according to a scale of the photographic map.

When the photographic map is displayed at a large scale, for instance larger than 100 m scales, a structure or a shape of a road is easily recognized. Thus, an information item, such as a road line, displayed on the road stands out from other information items displayed in other areas of the map. This makes the other items difficult to recognize. With the above-described method, the information item displayed on the road is moderated and therefore the other items are easily recognized.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
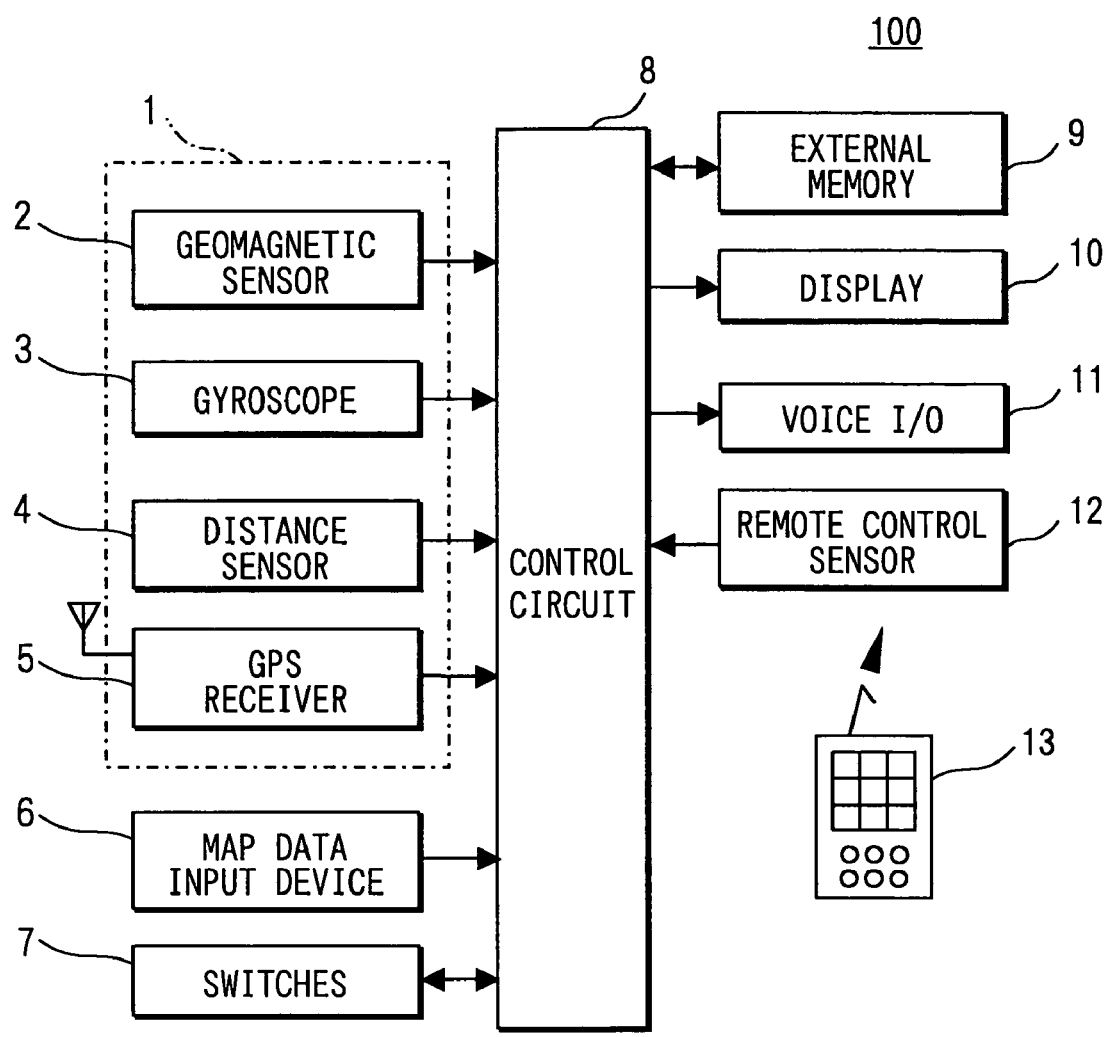
FIG. 1 is a block diagram of a navigation system according to an embodiment of the present invention.

The preferred embodiments of the present invention will be explained with reference to the accompanying drawings. In the drawings, the same numerals are used for the same components and devices.

First Embodiment

Referring to FIG. 1, a navigation system 100 includes a position detector 1, a map data input device 6, operation switches 7, an external memory 9, a display 10, a voice output device 11, and a remote control sensor 12. The navigation system 100 also includes a control circuit 8 that is connected with the above devices. The control circuit 8 is a regular computer including known CPU, ROM, RAM, I/O, and bus lines. The ROM stores a program that is executed by the control circuit 8. The CPU performs predetermined operations according to the program. This program may be loaded from an external device via the external memory 9.

The position detector 1 has a geomagnetic sensor 2, a gyroscope 3, a distance sensor 4, and a global positioning system (GPS) receiver 5. The GPS receiver 5 detects the current position of a vehicle based on radio waves from a satellite. Because these sensors have different types of measurement errors, they are configured to compensate for the errors by using more than one sensor. Only some of the sensors may be used if the sensors have high accuracy. Moreover, a steering angle sensor (not shown) or wheel speed sensors (not shown) can be used.

The map data input device 6 is provided for inputting map data. Rewritable memory devices including memory cards and hard disk drives are used in addition to read-only memory devices such as CD-ROM and DVD-ROM for storing various kinds of data. The map data contains road data, landmark data, background data, and aerial photograph data.

The road data contains link data and node data. Each road on the map is divided into multiple sections by nodes, and each section between the nodes is defined as a link. A road is formed on the map by connecting the links. The link data contains link IDs, link lengths, coordinates of start and end points of the links, road names, classification of roads, and road widths. The link IDs are identification numbers for identifying the links. The road names indicate names of roads such as the Tomei Expressway and route 1. The classification of roads includes a toll road, a national road, and a prefectural road.

The nodes indicate intersections, junctions, and forks in the roads. The node data contains node IDs, coordinates of the nodes, node names, connecting link IDs, and classification of the intersections. The node IDs are identification numbers assigned to the nodes. The connecting link IDs include the link IDs of all links that are connected with the node.

The background data contains data necessary for displaying backgrounds, including points of interest, mountains, rivers, and lakes, and for displaying boundaries between administrative districts. The administrative districts include prefectures, cities, wards, towns, and villages. The landmark data contains landmark names, marks for indicating prohibition of traffic, one-way traffic, and regulation of traffic, and coordinates (latitude, longitude).

The aerial photograph data contains image data on pictures taken from the sky. This data is used for displaying photographic images on the display 10 as a background of the map replacing the background formed from the background data. Each aerial photograph is taken for each administrative district and the data is organized by arranging the photographs in matrix based on locations of the districts. Coordinates of a reference point is provided with each cell of the matrix. A specific point in the cell or the cell containing a specific point that is requested for display is searched based on the reference point.

The switches 7 are provided for inputting various kinds of information. Touch-screen switches integrated with the display 10 or mechanical switches may be used for the switches 7 and a liquid crystal display (LCD) may be used for the display 10. A vehicle mark that indicates the current position of the vehicle detected by the position detector 1 and a map of the area in which the vehicle is currently located are displayed on the display 10. The map is produced from the map data inputted from the map data input device 6. The map can be displayed at predetermined different scales or scrolled through operation of switches 7 or a remote control (RC) 13.

The voice output device 11 includes speakers and an audio amplifier. The remote control (RC) sensor 12 receives operation signals from the RC 13 and outputs signals to the control circuit 8.

The navigation system 100 has a route guiding function. When a user inputs a destination to the navigation system 100 through operation of the switches 7 and the RC 13, the system 100 automatically searches an optimal route from the current position to the destination. The system 100 searches the optimal route based on the map data, calculates a guiding route, and displays it on the display 10. The optimal route is determined based on cost calculation using Dijkstra's algorithm. In Dijkstra's algorithm, an evaluation value is calculated using cost constants indicating road classiffication, a road width, the number of right and left turns, the number of passing intersections, traffic congestion, a link length, and a passing time.

Figure 3:
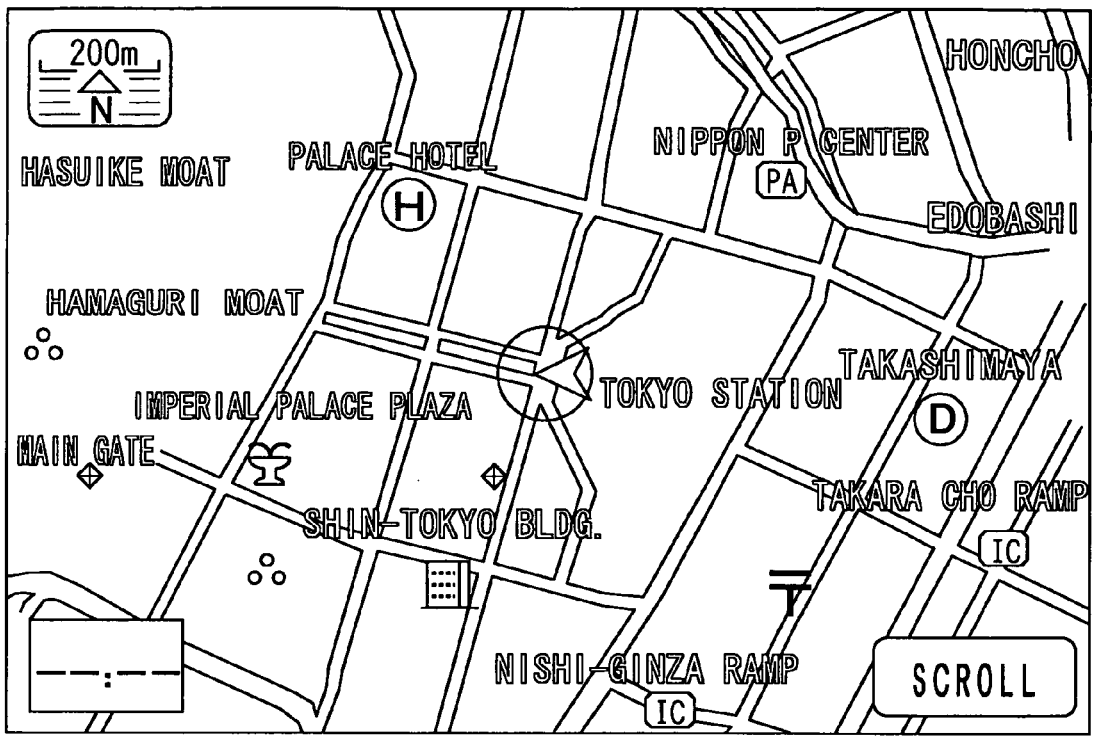
FIG. 3 is an example view of a map display in a two dimension map mode according to the embodiment.

The navigation system 100 displays a map in three different modes: a two dimensional (2D) map mode, a photographic map mode, and a combined map mode. In the 2D map mode, a regular two dimensional map, on which roads are drawn with lines, is displayed with points of interest and land marks using the road data, the landmark data, and the background data. An example of a map display in the 2D map mode is shown in FIG. 3.

Figure 4:
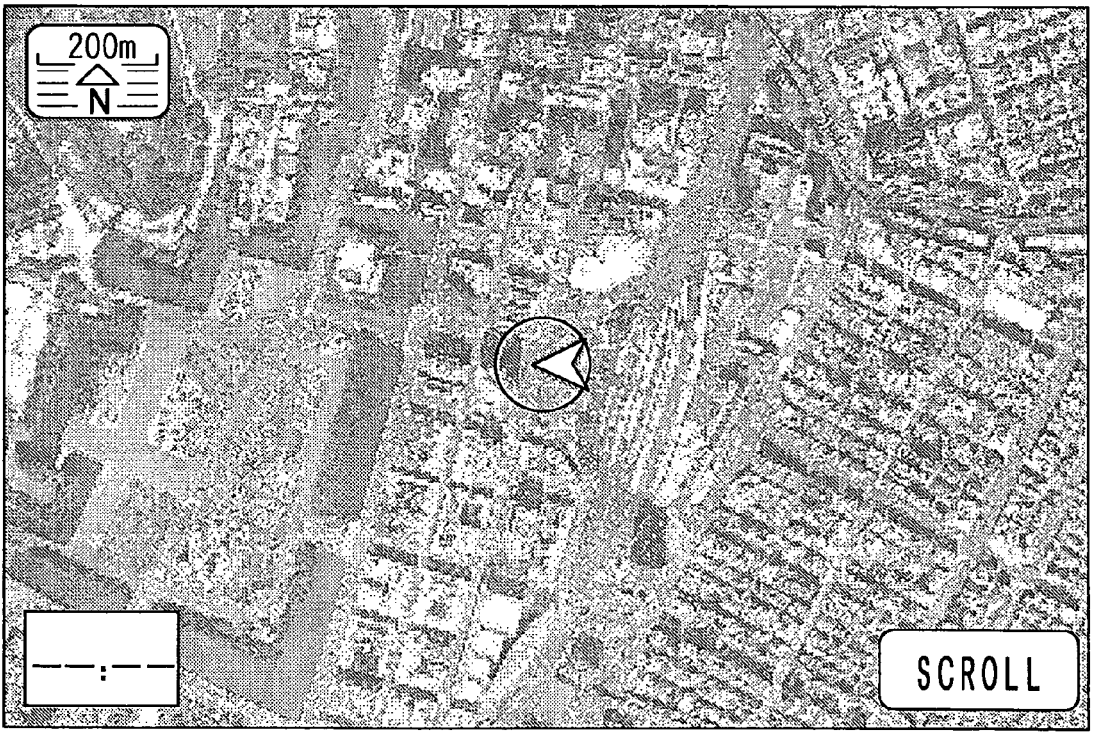
FIG. 4 is an example view of the display in a photographic map mode according to the embodiment.

In the photographic map mode, a photographic map is displayed using the aerial photograph data. An example of photographic map display in the photographic map mode is shown in FIG. 4. In the combined map mode, the road lines, the points of interest and the landmarks that are regularly displayed in the 2D map mode are displayed on the photographic map.

The scale of the map can be altered in predetermined steps in any mode. When a map is produced from the image data on a high-resolution aerial photograph in the combined map mode, the road lines may stand out because the roads can be clearly recognized at the high resolution. For instance, when a photographic map is displayed at a scale larger than 1 to 10,000, that is, a displayed scale is larger than 100 m, structures and shapes of the roads are clearly recognized. If the road lines are displayed on the clearly recognizable roads of the photographic map, they overemphasize the roads. As a result, displayed items other than the road lines become hard to recognize.

Figure 2:
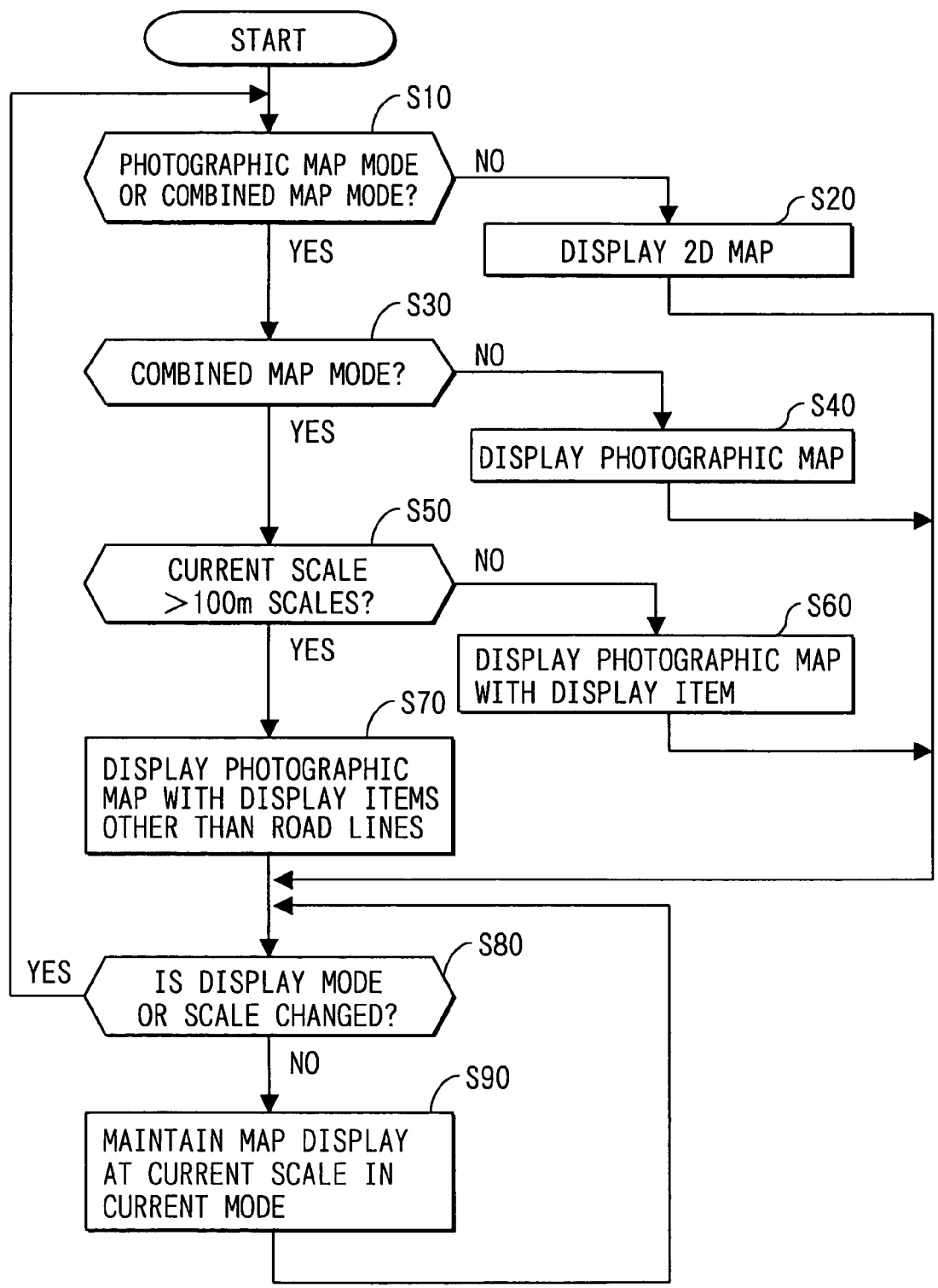
FIG. 2 is a flowchart showing a map display process according to the embodiment.

To solve this problem, the navigation system 100 controls display conditions of the road lines displayed on the photographic map according to the display scale. A process for displaying a map in the combined map mode will be discussed referring to FIG. 2.

Figure 5:
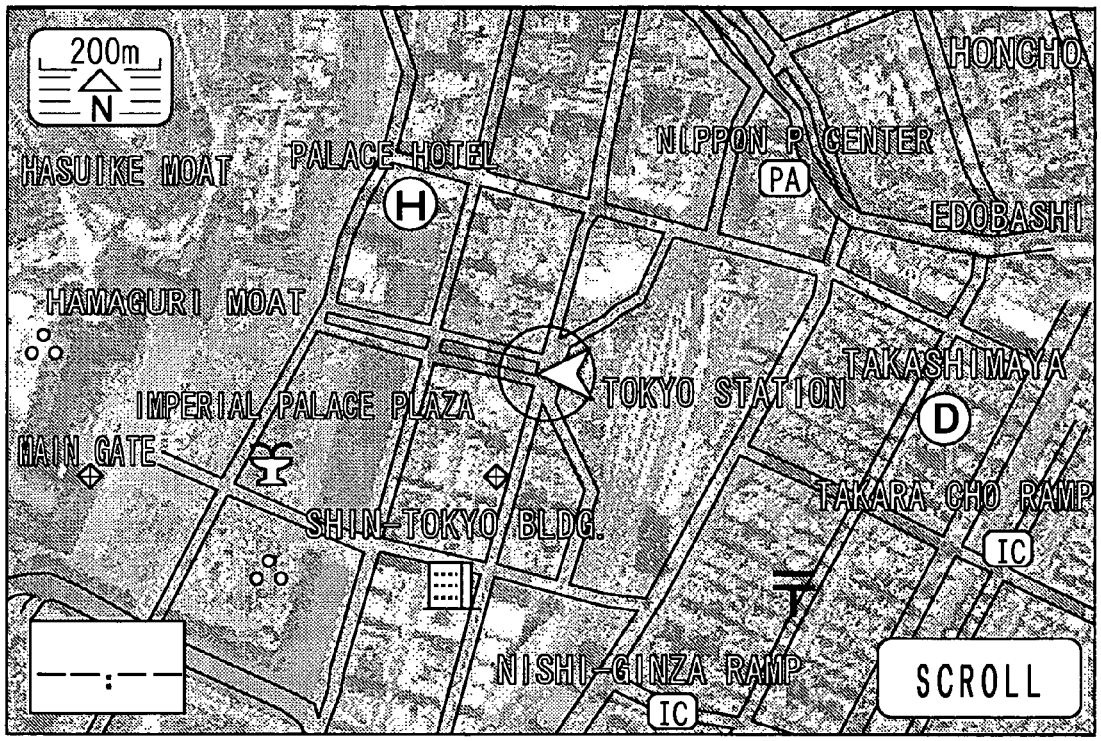
FIG. 5 is an example view of the display in a combined map mode.

It is determined the current display mode is the photographic map mode or the combined map mode (S10). If the current mode is not the photographic map mode or the combined map mode, a 2D map is displayed in the 2D map mode (S20). If the current mode is either the photographic map mode or the combined map mode, it is determined whether the current mode is the combined map mode (S30). If it is not so, a photographic map is displayed in the photographic map mode (S40). If it is so, in step S30, it is determined whether the current scale is larger than 100 m scales (S50). If it is not so, a photographic map is displayed with display items of the 2D map including road lines in the combined map mode as shown in FIG. 5 (S60). If it is so, in step S50, display items other than the road lines are displayed on the photographic map (S70).

Figure 6:
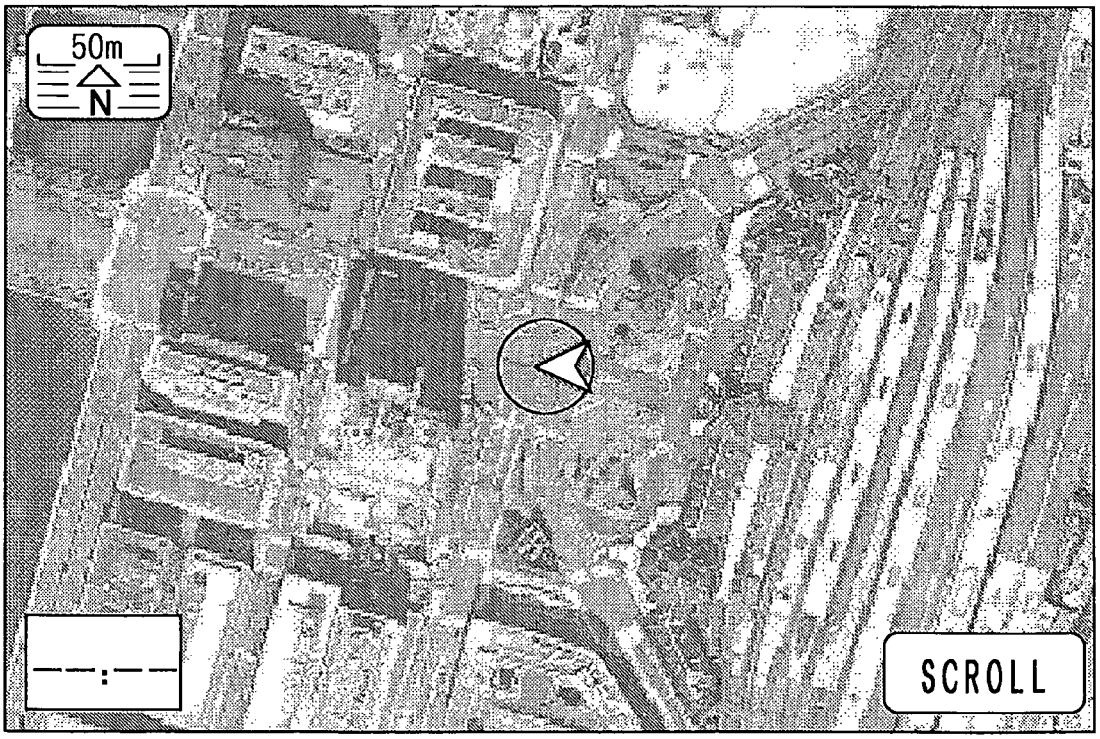
FIG. 6 is an example view of the display without road lines in the combined map mode.

An example of the map with the scale 50 m is shown in FIG. 6. At this scale, the structures and the shapes of the roads are clearly recognized from the photographic map itself. Therefore, the road lines are not displayed on the photographic map. As a result, the display items other than the road lines are clearly recognized. It is determined whether the display mode or the scale is altered (S80). If it is so, steps S10 through S80 are repeated. If it is not so, the map remains displayed at the current scale in the current display mode (S90).

The navigation system 100 displays the road lines on the photographic map in the combined map mode when the map is a wide-area map at the scale equal to or smaller than 100 m. It does not display the road lines when the map is a small-area map at the scale larger than 100 m and only displays the information items other than the road lines. Thus, the information items are clearly recognized.

The present invention should not be limited to the embodiment previously discussed and shown in the figures, but may be implemented in various ways without departing from the spirit of the invention. For example, the road lines may be toned down and displayed at the scales larger than 100 m scales. Translucent, dashed, chain, or broken lines may be used for indicating different structures of the roads and for moderating the road lines so that they do not stand out from other information items.

Narrow streets in residential areas are often clearly recognized at the scale that the wide roads are clearly recognized. If all of the clearly recognizable narrow streets are displayed with the road lines, a large number of road lines are displayed. As a result, the information items displayed on the map are difficult to recognize even when the road lines are toned down.

Figure 7:
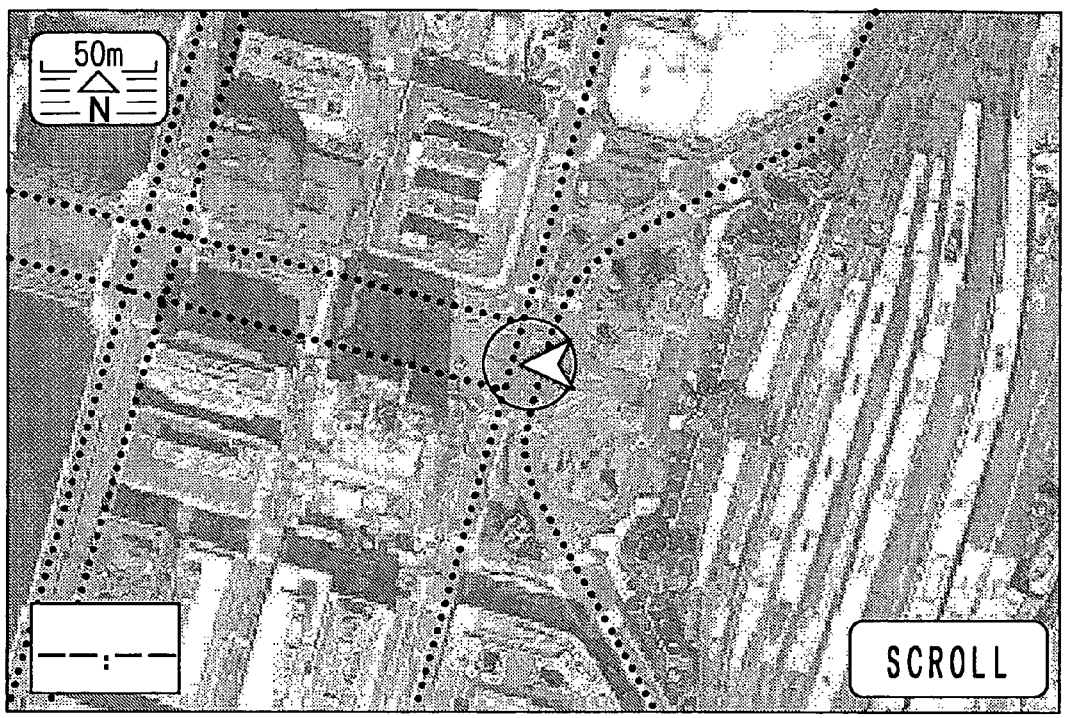
FIG. 7 is an example view of the display with dashed road lines according to a modification of the embodiment.

To solve this problem, only main roads, such as toll roads, national roads, and prefectural roads, are displayed with the toned down lines. An example of the map on which only main roads are indicated with the road lines is shown in FIG. 7. In this example, only main roads are indicated with dashed lines. Thus, the information items are clearly recognized. In this case, a road specifying means may be provided so that the user can select kinds of roads for displaying the roads with the toned down lines.

Figure 8:
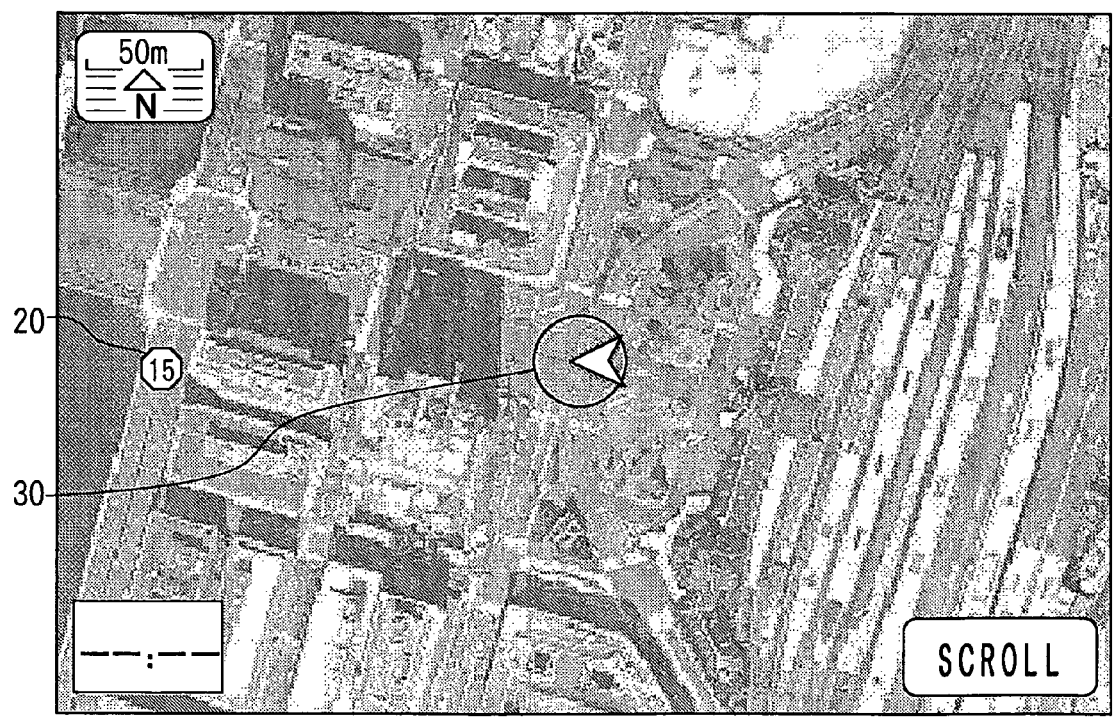
FIG. 8 is an example view of the display with an icon of a national road according to a modification of the embodiment.

It is preferable to display icons or marks on the map for indicating kinds of roads at the scale larger than 100 m because it might be difficult to find a road without any indication. An example of the map with an icon for indicating a road is shown in FIG. 8. An icon 20 for indicating a national road is displayed on a corresponding road on the map. The icon 20 is displayed so that it does not disturb the display of a vehicle position mark 30 that indicates the current position of the vehicle. By displaying marks or icons that indicate kinds of roads on the map, information items other than the road lines are clearly recognized and the kinds of roads are easily recognized.

What is claimed is:

1. A map display device comprising:
   map data storing means that stores photographic data on photographs taken from the sky and map data including an information item that provides road information;
   display means that displays a photographic map based on the photographic data and the map data;
   scale changing means that changes a reduction scale of the photographic map; and
   display control means that controls display condition of the information item displayed on the photographic map according to the reduction scale of the photographic map
   wherein the display control means controls the display condition of the information item such that the road information is not displayed at a reduction scale larger than a predetermined scale.

2. A map display device, comprising:
   map data storing means that stores photographic data on photographs taken from the sky and map data including an information item that provides road information;
   display means that displays a photographic map based on the photographic data and the map data;
   scale changing means that changes a reduction scale of the photographic map; and
   display control means that controls display condition of the information item displayed on the photographic map according to the reduction scale of the photographic map,
   wherein the display control means controls display condition of the information item such that the information item is toned down when the reduction scale of the photographic map is changed to be smaller than a predetermined scale from a reduction scale larger than the predetermined scale.

3. The map display device according to claim 2, wherein:
   the map data storing means further stores information items that provide kinds of roads as road information; and
   the display control means controls display conditions of the information items such that an information item related to a specific kind among the kinds of roads is toned down and other information items are not displayed.

4. The map display device according to claim 1, wherein:
   the map data storing means further stores information items that provide kinds of roads as road information; and
   the display control means displays the information items that provide kinds of the road as the road information at a reduction scale smaller than the predetermined scale.

5. The map display device according to claim 4, wherein the display control means displays the information items with marks that correspond to kinds of road on the map as the road information.

6. A method for displaying a map, comprising:
   displaying a photographic map and the information item based on photographic data on photographs taken from the sky and map data including an information item that provides road information; and
   controlling display condition of the information item displayed on the photographic map according to a reduction scale of the photographic map;
   wherein the controlling step deletes the information item when the reduction scale of the photographic map is changed larger than a predetermined scale.

7. A method for displaying a map, comprising:
   displaying a photographic map and the information item based on photographic data on photographs taken from the sky and map data including an information item that provides road information; and
   controlling display condition of the information item displayed on the photographic map according to a reduction scale of the photographic map;
   wherein the controlling step tones down the information item when the reduction scale of the photographic map is changed to be smaller than a predetermined scale from a reduction scale larger than the predetermined scale.

8. The method according to claim 7, wherein:
   the road information includes kinds of roads;
   the information item toned down in the display condition controlling step is related to a specific kind among the kinds of roads; and
   the controlling step further controls the display condition of other information items such that the road information related other than the specific kind of roads are not displayed.

9. The method according to claim 6, wherein:
   the road information includes kinds of roads; and
   the information item displayed in the displaying step at a reduction scale of the photographic map smaller than the predetermined scale is related to one of the kinds of roads.

10. The method according to claim 9, wherein the information item related to the one of the kinds of roads is displayed with a mark corresponding to the kind of roads.

11. The map display device according to claim 1, wherein:
    when the reduction scale is larger than the predetermined scale, the display means displays the photographic map in detail for displaying a small-area map.

12. The map display device according to claim 2, wherein:
    when the reduction scale is smaller than the predetermined scale, the display means displays the photographic map as a large-area map.

* * * * *